United States Patent [19]
Nuckolls

[11] Patent Number: 5,664,716
[45] Date of Patent: Sep. 9, 1997

[54] TANK PANEL WITH REMOVABLE POUCH FOR MOTORCYCLES

[76] Inventor: Glenn S. Nuckolls, 305 1st St. East, Altoona, Iowa 50009

[21] Appl. No.: 605,376

[22] Filed: Feb. 22, 1996

[51] Int. Cl.$^6$ ............................................. B62J 9/00
[52] U.S. Cl. .................... 224/430; 224/439; 224/463; 224/417; 190/110
[58] Field of Search .................... 224/412, 413, 224/417, 428, 429, 430, 431, 450, 583, 649, 666, 625, 626; 190/110; 220/480, 481, 482; 150/167; D12/406, 407

[56] References Cited

U.S. PATENT DOCUMENTS

| | | | |
|---|---|---|---|
| 984,402 | 2/1911 | Tuttle | 224/625 |
| 2,527,433 | 10/1950 | Rochelle | 224/413 |
| 3,741,429 | 6/1973 | Purcell, Jr. et al. | 220/480 |
| 3,874,574 | 4/1975 | Heise | 224/430 |
| 4,044,933 | 8/1977 | Artz | 224/674 |
| 4,057,794 | 11/1977 | Grossfield | 224/666 |
| 4,059,207 | 11/1977 | Jackson et al. | 224/413 |
| 4,068,859 | 1/1978 | Dittman | 224/413 |
| 4,175,630 | 11/1979 | Fleisher et al. | 180/225 |
| 4,266,703 | 5/1981 | Litz | 224/413 |
| 4,311,261 | 1/1982 | Anderson et al. | 224/450 |
| 4,359,233 | 11/1982 | Jackson et al. | 224/413 |
| 4,562,944 | 1/1986 | Jackson et al. | 224/430 |
| 4,588,114 | 5/1986 | Lebaron et al. | 224/413 |
| 4,673,070 | 6/1987 | Ambal | 190/110 |
| 4,802,682 | 2/1989 | Yasuji | 180/219 |

FOREIGN PATENT DOCUMENTS

| | | | |
|---|---|---|---|
| 7323400 | 2/1975 | France | 224/32 R |
| 3505703 | 10/1985 | Germany | 224/32 R |
| 4107008 | 9/1992 | Germany | 224/32 R |
| 4230360 | 3/1994 | Germany | 224/42.01 |

OTHER PUBLICATIONS

Custom Chrome Incorporated; "Custom Chrome—Putting It All Together"; pp. 29 and 30; Copyright 1990.

*Primary Examiner*—Henry J. Recla
*Assistant Examiner*—Gregory M. Vidovich
*Attorney, Agent, or Firm*—Henderson & Sturm

[57] ABSTRACT

A tank panel apparatus including a base member is adapted to be attached to a motorcycle fuel tank. A slot is disposed on a top surface of the base member for receiving a projection of a container and a release mechanism is also provided on the container to hold the projection in the slot and consequently hold the container to the base member. The container also includes a belt clip or belt loop so that the motorcycle operator can attach the container to his or her belt once it is removed from the motorcycle tank panel and which container can readily and quickly be re-attached to the motorcycle tank panel.

11 Claims, 4 Drawing Sheets

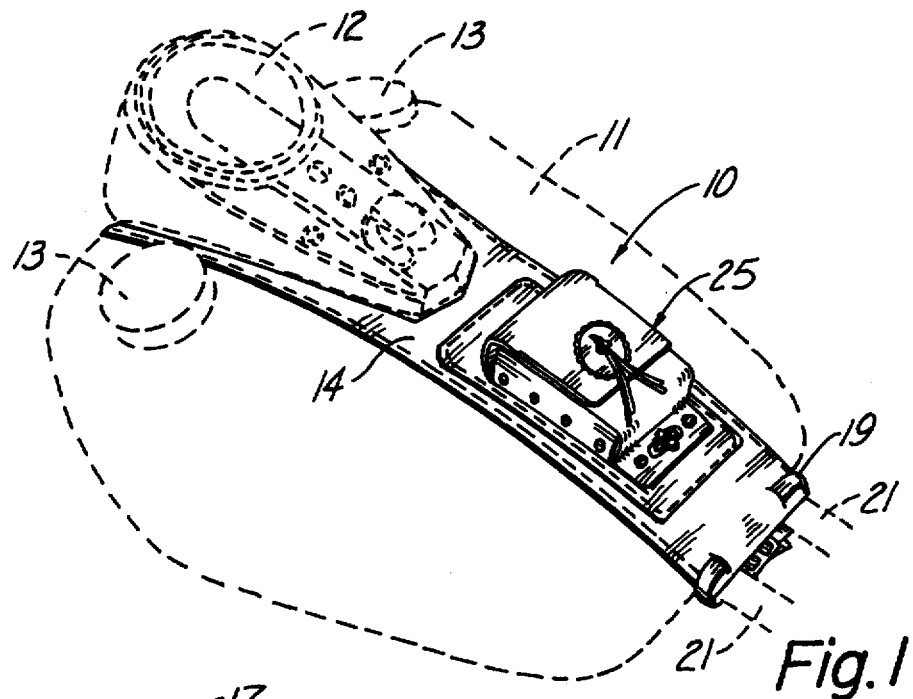
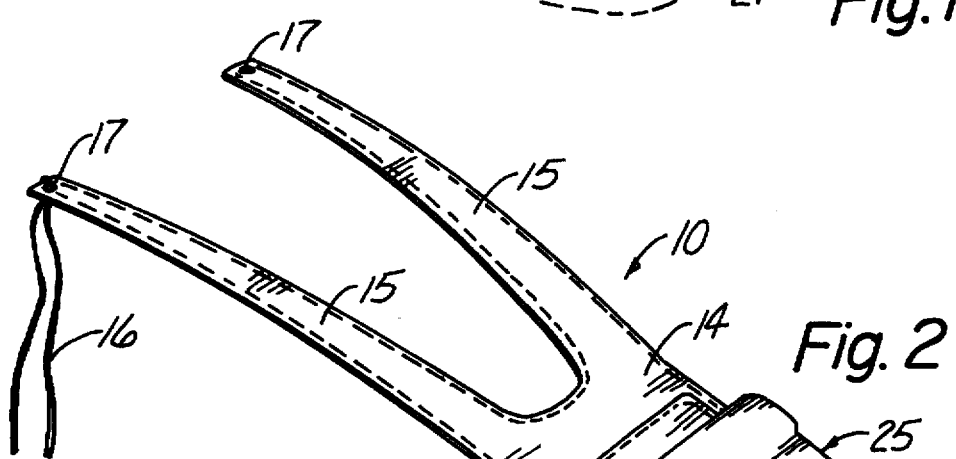
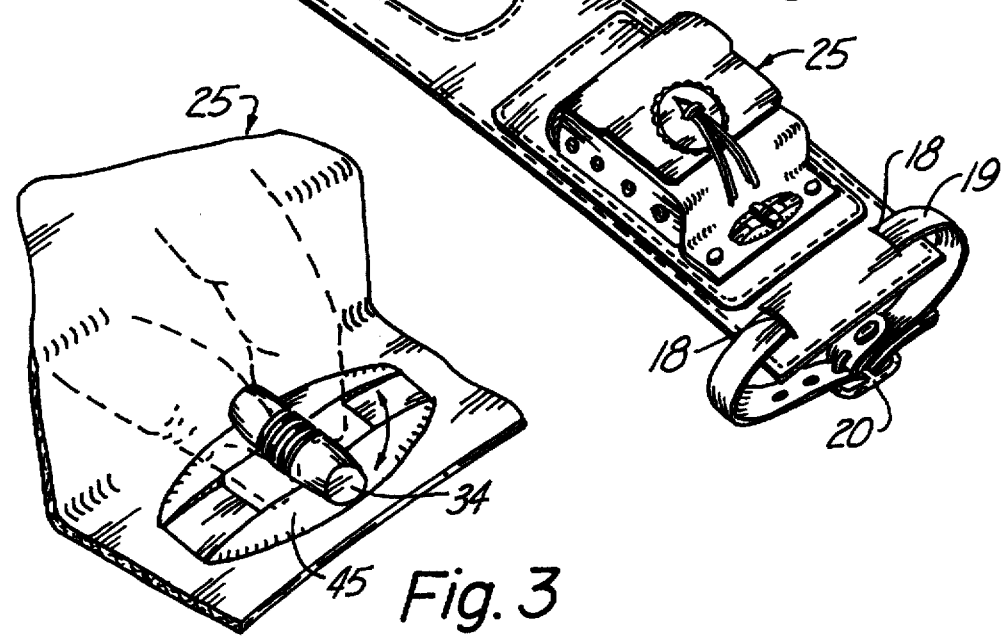

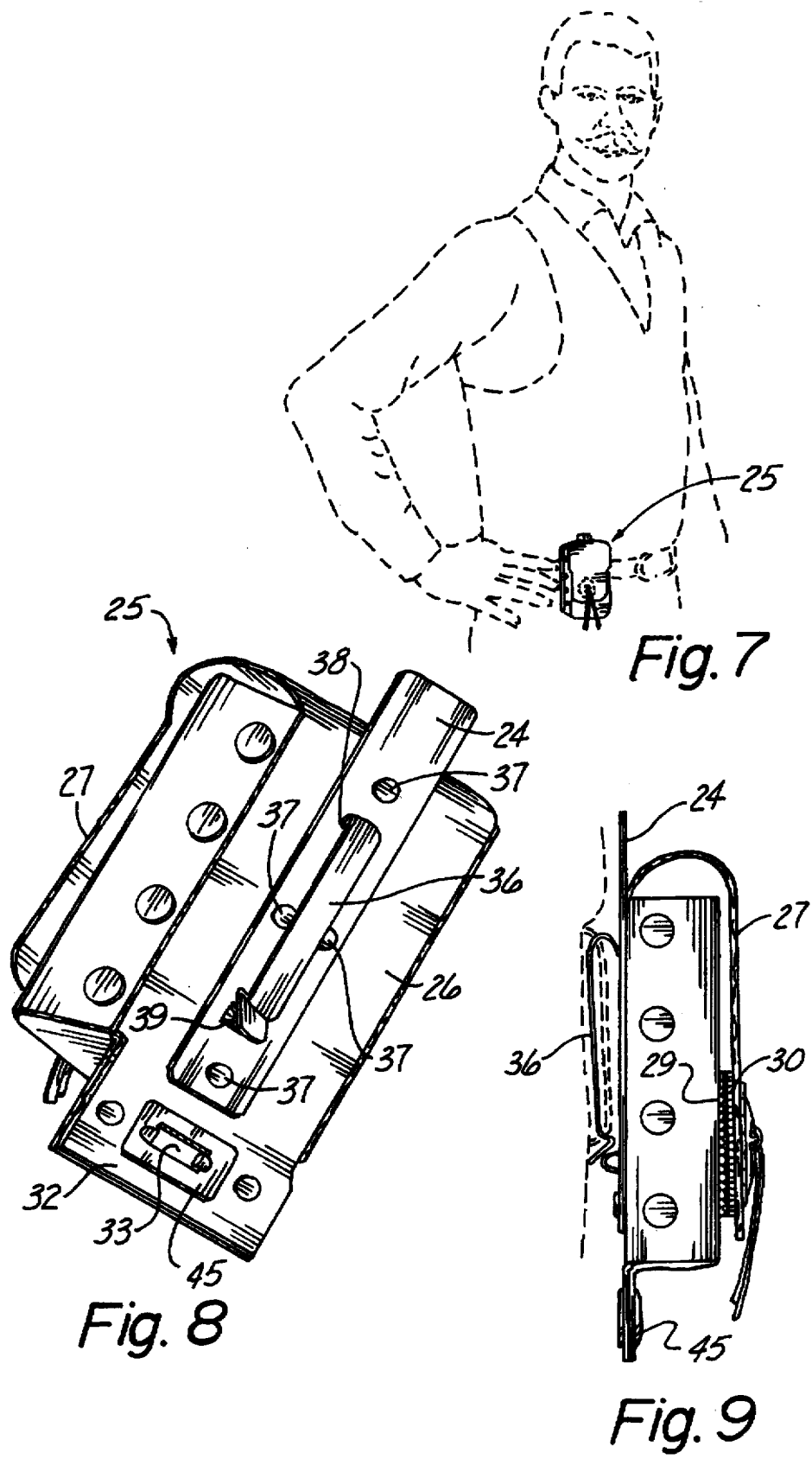

TANK PANEL WITH REMOVABLE POUCH FOR MOTORCYCLES

TECHNICAL FIELD

The present invention relates generally to tank panels for motorcycles and more particularly to such a tank panel which fits on top of a motorcycle fuel tank and has a removable pouch or container for holding items which are readily needed or for valuables or the like.

BACKGROUND ART

People who ride motorcycles generally have a storage problem when they wish to carry items with them on the motorcycle. Various containers or saddle bag-like devices have been proposed in the past, but typically these storage devices are placed on the motorcycle behind the motorcycle seat and are not readily accessible to the operator of the motorcycle either while the motorcycle is moving or upon stopping of the motorcycle while still seated on the motorcycle seat. One solution to this problem has been the use of a leather tank panel with pouch which is secured by Velcro to a leather tank panel which is buckled or tied to the top of a motorcycle fuel tank. While the location is quite convenient for use while riding or stopping temporarily, users have complained that they do not feel secure in placing valuable items in a pouch which is secured only by Velcro because of the possibility that it could become detached while the motorcycle is in use.

Other tank panels have had pouches or containers sewn therethrough so that the tank panel itself must be untied from the motorcycle and/or unstrapped from the motorcycle tank when the user stops at a restaurant or other place where the motorcycle operator would leave his or her motorcycle parked and while the operator goes somewhere else. It is important for example, for a motorcycle operator who smokes to want close access to a package of cigarettes. When such person stops, he or she usually wants to take the cigarettes into a restaurant or the like. This entails the transfer of items in a pouch or container to pant or coat pockets on the one hand or taking the entire tank panel off of the motorcycle on the other hand. In the case of the above described detachable pouch, it could merely be removed by Velcro.

Consequently, there is a need for a removable tank panel container or pouch which the user can feel certain will not be lost during the operation of the motorcycle, while still being able to conveniently hold such a container onto the motorcyle. The container should also be readily available while the operator is separated from the motorcycle itself.

DISCLOSURE OF THE INVENTION

The present invention relates to a tank panel apparatus including a base member adapted to be attached to a motorcycle fuel tank. A slot is disposed on a top surface of the base member for receiving a projection of a container and a release mechanism is also provided on the container to hold the projection in the slot and consequently to hold the container to the base member. The container also includes a belt clip or belt loop so that the motorcycle operator can attach the container to his or her belt once it is removed from the motorcycle tank panel and which container can readily and quickly be re-attached securely to the motorcycle tank panel.

An object of the present invention is to provide an improved tank panel for motorcycles which has a removable container secured thereto.

Another object of the present invention is to provide a container which is removable from the tank panel but which is secured in a very positive way so that the user can feel confident that it will not fall off during the operation of the motorcycle.

Another object of the present invention is to provide a belt clip or belt loop on such removable container so that is can readily be attached to the belt of the motorcycle operator when not attached to the motorcycle itself.

A still further object of the present invention is to provide a container which is easily attached or detached from the motorcycle tank panel and/or to or from a motorcycle operator's belt.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of a motorcycle tank panel having a preferred embodiment of the removable container attached thereto and having such apparatus shown attached to a motorcycle fuel tank, which is shown in dashed lines;

FIG. 2 is a perspective view of the tank panel and container separated from the motorcycle;

FIG. 3 is an enlarged broken away section of the clasp of the container showing a hand in dashed lines and showing how the clasp can be rotated in order to attach or detach the container to the tank panel;

FIG. 7 is a perspective view of the container attached to the belt of a motorcycle operator and his belt;

FIG. 8 is a perspective view showing the back side of a preferred embodiment of the container showing the belt clip, the projection and the openings of the clasp;

FIG. 9 is a side elevational view of the container of the present invention shown attached to the belt of a motorcycle operator, such belt and operator being shown in dashed lines;

BEST MODES FOR CARRYING OUT THE INVENTION

Figure 4:
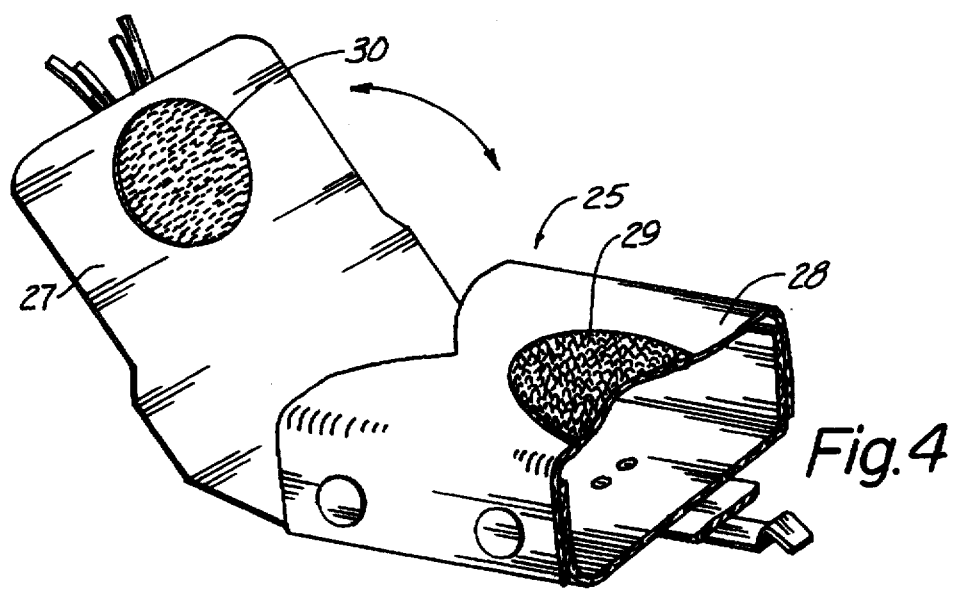
FIG. 4 is a perspective broken away view of the container showing a Velcro attachment for the flap and a belt clip for attachment to the belt of a motorcycle operator.

Referring now to the drawings wherein like reference numerals designate identical or corresponding parts throughout the several views, FIG. 1 shows a tank panel apparatus (10) with a container attached thereto. The tank panel (10) is attached to a motorcycle fuel tank (11) shown in dashed lines, the tank having a combination speedometer/ odometer and fuel gauge (12) secured to the top thereof and fuel tank caps (13) also shown in dashed lines in FIG. 1.

The tank panel base member (14) is essentially a big piece of leather which has in one embodiment long straps (15) which can be secured around the frame portion (not shown) by leather cords (16) extending through openings (17) in straps (15).

The other end of the tank panel (14) includes a pair of slots (18) to allow a strap (19) with a buckle (20) thereon to be used to secure the lower end of the tank panel (14) to motorcycle frame parts (21) or the like as are shown in dashed lines in FIG. 1.

Figure 5:
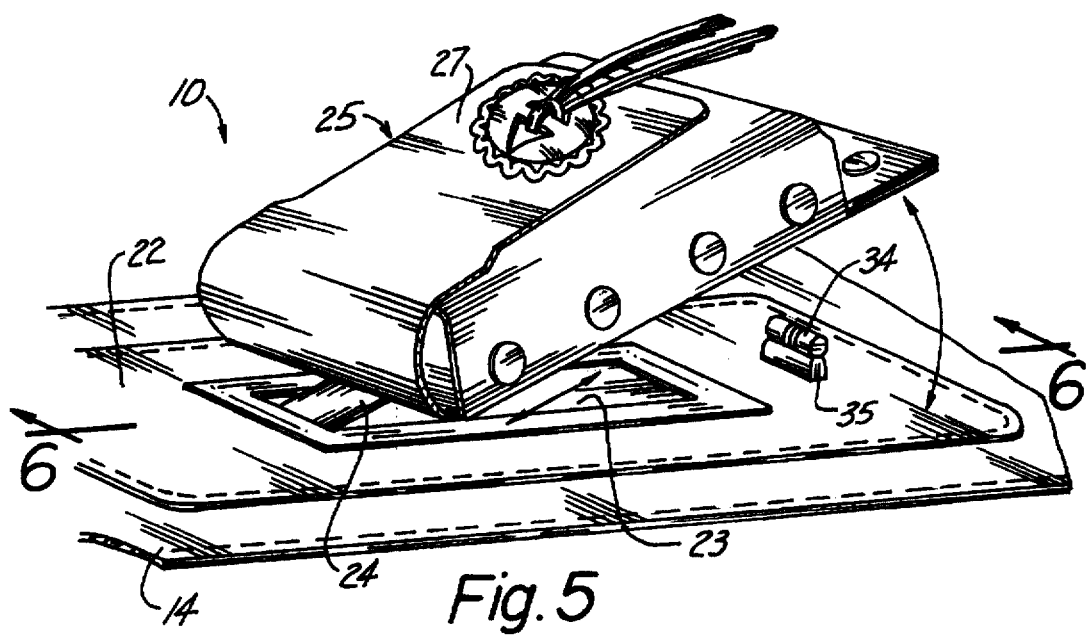
FIG. 5 is a perspective view of the present invention showing how a projection on the container can slide into a slot for attachment or for detaching the container.
Figure 6:
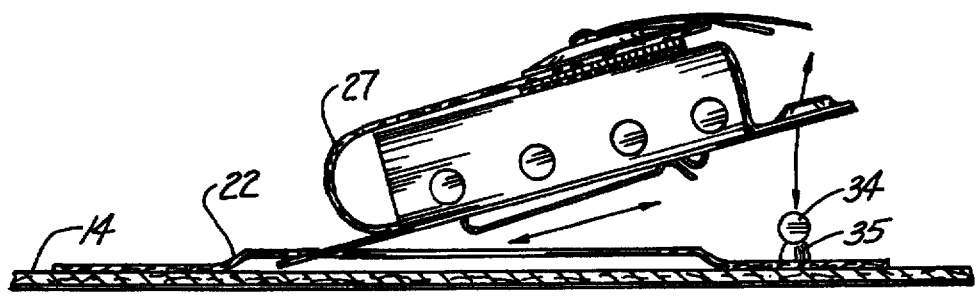
FIG. 6 is a cross sectional view taken along the line 6—6 of FIG. 5 and showing how the projection of the container fits in a slot and how an opening in the bottom of the container can fit over a clasp and thereby be secured to the tank panel.

Referring to FIG. 5, it is noted that a second piece of leather (22) is sewn to the tank panel (14) and has an opening (23) disposed therein.

The container itself, which can best be seen in FIGS. 5-8, includes a projection (24) secured to the back panel (26) of the container (25). The back side of the container (25) includes a continuous strap (27) which extends over the front panel (28) which has a hook fastener (29) for attachment with loop fasteners (30) secured to the underside of the flap (27). Extending downwardly and being an extension of the back panel (26) is a portion (32) as shown in FIG. 8, which has an opening (33) therein to receive a clasp (34) therethrough as can be seen in FIGS. 1-3, 5 and 6. This clasp (34) is pivotal about a shaft (not shown) attached to base (35) which is, in turn, attached to the leather layer (22). A belt clip (36) is secured to the back panel (26) of the container (25), as can readily be seen in FIG. 8, which has rivets (37) which attach the rigid plastic projection (24) to the back panel (26) of the container (25). The metal belt clip (36) extends through a slot (38) and extends downwardly to a slot (39) in the rigid plastic projection (24).

In use, the apparatus (10) would be strapped to and/or tied to the motorcycle fuel tank (11) as shown in FIG. 1. To remove the container (25) from the tank panel (14), the clasp (34) would be moved from the position shown in FIGS. 1-3 to the position shown in FIGS. 5 and 6 whereby the rear lower end of the container (25) can be moved upwardly to the position shown in FIGS. 5 and 6 and then pulled backwardly and outwardly so that the projection (24) is removed from under the slot formed between the panel (22) and the tank panel (14). The container (25) can then be placed on the belt of the user as shown in FIGS. 7 and 9. The motorcycle operator can open or close the flap (27) by overcoming the holding force of hook and loop fasteners (29) and (30) as is well known. When it is desired to return the container to the tank panel (14), the reverse process is used such that referring to FIG. 5, the projection (24) would be placed back in the slot formed between the leather panel (22) and (14) and the container (25) would be slid toward the front of the fuel tank (11) until the opening (33) is aligned with the clasp (34) at which time the rear portion (32) would be moved downwardly in the downward direction of the arrows of FIGS. 5 and 6, whereupon the clasp (34) would be moved to the position shown in FIGS. 1-3 to hold the container (25) securely in place.

Figure 10:
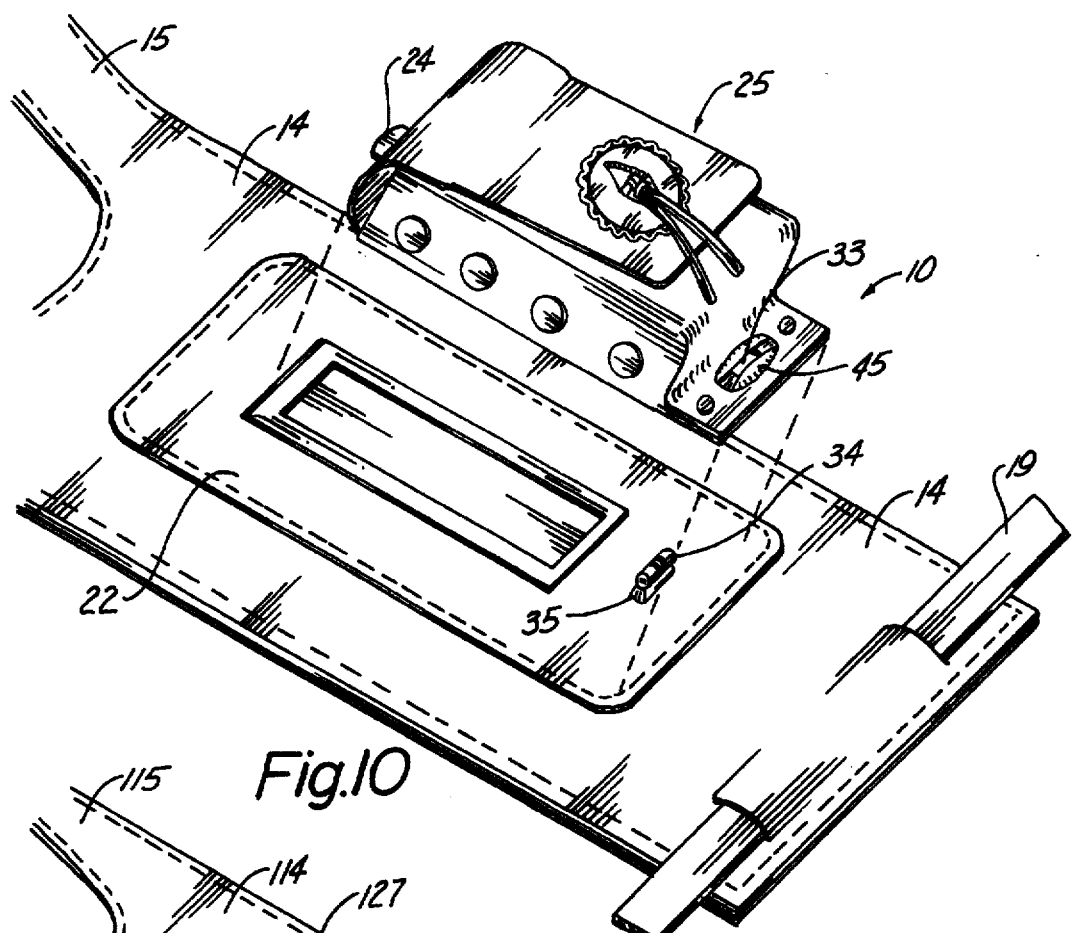
FIG. 10 is a perspective view of the present invention showing it exploded away from the tank panel and having a strap on the bottom side of the tank panel.
Figure 11:
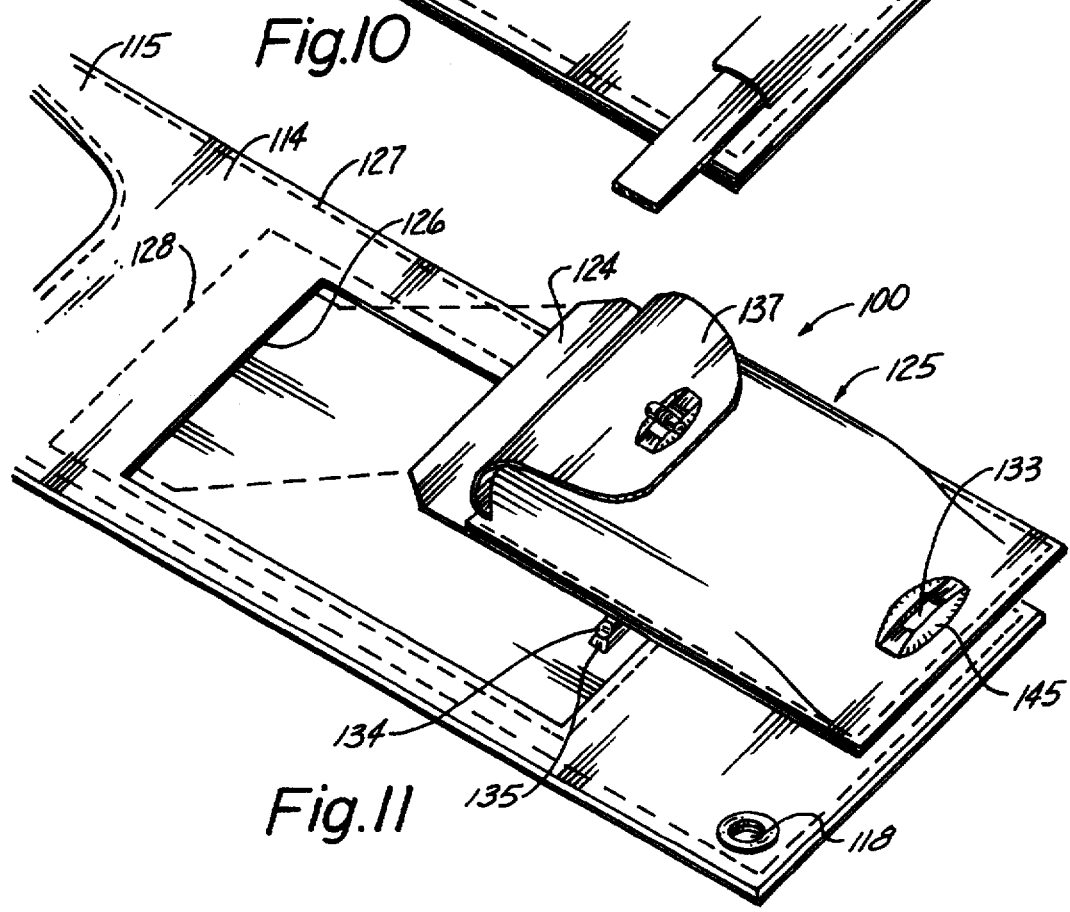
FIG. 11 is an alternate embodiment of the present invention showing the projection extending all the way across the container or pouch and the tank panel having grommets to protect openings whereby cords can be used to pass therethrough to attach the bottom of the tank panel to a motorcycle.

Referring now to FIG. 10, the container (25) is shown exploded away from the tank panel (14). FIG. 11 shows an alternate embodiment (100) which has a tank panel (114) with straps (115) for attaching the tank panel (114) at the top or front portion of the motorcycle and grommets (118) for allowing cords (not shown) to tie the bottom of the tank panel to frame members such as frame members (21) of FIG. 1. The container or pouch (125) has the entire back constructed of a stiff plastic material (124) which slides under a slot (126), it being noted that the tank panel (114) is comprised of two layers of leather sewn together by stitches (127) and (128). The container (125) uses a clasp (134) and (135) which is just like the clasp (34) and (35) in FIGS. 1-6 and the opening (133) is disposed through the bottom of the pouch (125) through metal portion (145) just like metal portion (45) shown in FIG. 3. Similarly, a clasp structure identical to the clasp structure (133), (134), (135) and (145) is used to lock the flap (137) of the container (125) open or closed.

Obviously many modifications and variations of the present invention are possible in light of the above teachings. It is therefore to be understood that, within the scope of the appended claims, the invention may be practiced otherwise than as specifically described.

I claim:

1. A motorcycle fuel tank panel apparatus comprising:

a base member comprising a substantially flexible planar member having oppositely facing bottom and top surfaces, said bottom surface adapted to cover and engage at least a portion of a top surface of a motorcycle fuel tank positioned between handlebars and a seat of a motorcycle;

a slot disposed on said top surface between a forward end and a rearward end of said planar member, said planar member having a length defined between said forward and rearward ends which extends substantially along the longitudinal axis of the motorcycle;

a container having a first end portion and a second opposite end portion;

a substantially stiff projection attached to and extending from said first end portion of said container and receivable in to or out from said slot; and attaching means disposed on said second opposite end portion for releasably attaching said second opposite end portion of said container to said planar member.

2. The apparatus of claim 1 wherein said attaching means comprises a clasp attached to said planar member an opening in said second opposite end portion of said container, and said clasp receivable through said opening, said clasp being movable between a first position for holding said container to said planar member and a second position allowing said clasp to pass through said opening.

3. The apparatus of claim 1 wherein the container has a front panel, back panel, sides, bottom and a top opening.

4. The apparatus of claim 3 including a belt clip attached to the back panel of the container.

5. The apparatus of claim 3 including a flap attached to the back panel and movable between a first position opening the top opening and a second position closing the top opening.

6. The apparatus of claim 5 including means for selectively holding the flap in the first position thereof.

7. The apparatus of claim 6 wherein the holding means includes a hook and loop fastener attached to the flap and to the front panel of the container.

8. The apparatus of claim 1 further comprising connecting means for releasably connecting said planar member to the fuel tank.

9. The apparatus of claim 8 wherein the connecting means includes a strap and buckle.

10. The apparatus of claim 8 wherein the connecting means includes cords for tying the base member to the motorcycle.

11. The apparatus of claim 1 wherein said slot is formed between said planar member and a panel member attached to said planar member.

* * * * *